(12) United States Patent
Zheng et al.

(10) Patent No.: US 11,570,861 B2
(45) Date of Patent: Jan. 31, 2023

(54) LIGHT-EMITTING DIODE (LED) DRIVE POWER SUPPLY AND CONTROLLER THEREOF

(71) Applicant: Shanghai Silicon Driver Semiconductor Technology Co., Ltd., Shanghai (CN)

(72) Inventors: Yue Zheng, Shanghai (CN); Wei-Ming Liao, Shanghai (CN); Xiao-Bo Hu, Shanghai (CN)

(73) Assignee: SHANGHAI SILICON DRIVER SEMICONDUCTOR TECHNOLOGY CO., LTD., Shanghai (CN)

( * ) Notice: Subject to any disclaimer, the term of this patent is extended or adjusted under 35 U.S.C. 154(b) by 57 days.

(21) Appl. No.: 17/203,353

(22) Filed: Mar. 16, 2021

(65) Prior Publication Data

US 2021/0298142 A1 Sep. 23, 2021

(30) Foreign Application Priority Data

Mar. 17, 2020 (CN) .......................... 202010187570.1

(51) Int. Cl.
*H05B 45/14* (2020.01)
*H05B 45/34* (2020.01)

(52) U.S. Cl.
CPC ............. *H05B 45/14* (2020.01); *H05B 45/34* (2020.01)

(58) Field of Classification Search
CPC ......... H05B 45/10; H05B 45/30; H05B 47/10
See application file for complete search history.

(56) References Cited

U.S. PATENT DOCUMENTS

| 9,496,855 | B2* | 11/2016 | Maru ....................... H03K 4/48 |
| 9,609,701 | B2* | 3/2017 | Melanson ............. H05B 47/10 |
| 2010/0207536 | A1* | 8/2010 | Burdalski .......... H05B 45/3725 |
| | | | 315/224 |
| 2013/0002159 | A1* | 1/2013 | Chen .................. H05B 45/3725 |
| | | | 315/200 R |
| 2013/0215655 | A1* | 8/2013 | Yang ..................... H05B 45/44 |
| | | | 363/89 |
| 2013/0307431 | A1* | 11/2013 | Zhu ...................... H05B 45/385 |
| | | | 315/210 |
| 2017/0222561 | A1* | 8/2017 | Ivankovic ............... H02M 1/44 |
| 2018/0091139 | A1* | 3/2018 | Nakagomi ....... H03K 17/08122 |
| 2019/0335556 | A1* | 10/2019 | Li .......................... H05B 45/10 |
| 2021/0100082 | A1* | 4/2021 | Aoki ..................... H05B 45/38 |
| 2021/0298142 | A1* | 9/2021 | Zheng ................... H05B 45/14 |

* cited by examiner

*Primary Examiner* — Jason Crawford
(74) *Attorney, Agent, or Firm* — Muncy, Geissler, Olds & Lowe, P.C.

(57) ABSTRACT

The invention provides an LED drive power supply and a controller thereof. The controller comprises a ground terminal, a sampling terminal, and a power supply terminal. The ground terminal and an output ground of a power supply module have different potentials. A drain of a power switching transistor is coupled to a positive output terminal of the power supply module, a source of the power switching transistor and the sampling terminal are coupled to a first terminal of a sampling resistor, and a second terminal of the sampling resistor is coupled to the ground terminal. The controller further includes a logic control circuit determining whether a sampling voltage input by the sampling terminal is zero; a driver generating a first driving signal to the power switching transistor; and a bias circuit configured to receive a power supply voltage.

21 Claims, 8 Drawing Sheets

Fig. 1

PRIOR ART

Fig. 2

PRIOR ART

LIGHT-EMITTING DIODE (LED) DRIVE POWER SUPPLY AND CONTROLLER THEREOF

FIELD OF THE INVENTION

The invention relates to the field of light-emitting diode (LED) lighting, and more particularly to an LED drive power supply and a controller thereof.

BACKGROUND OF THE INVENTION

The light-emitting diode (LED) drive power supply with the non-isolated step-down drive structure is the most widely used since the non-isolated step-down circuit has the most simple structure among the other types of circuit, and the required peripheral circuits are also relatively simple. Therefore, the LED drive power supply with non-isolated step-down drive structure has advantages of low costs and high reliability.

Figure 1:
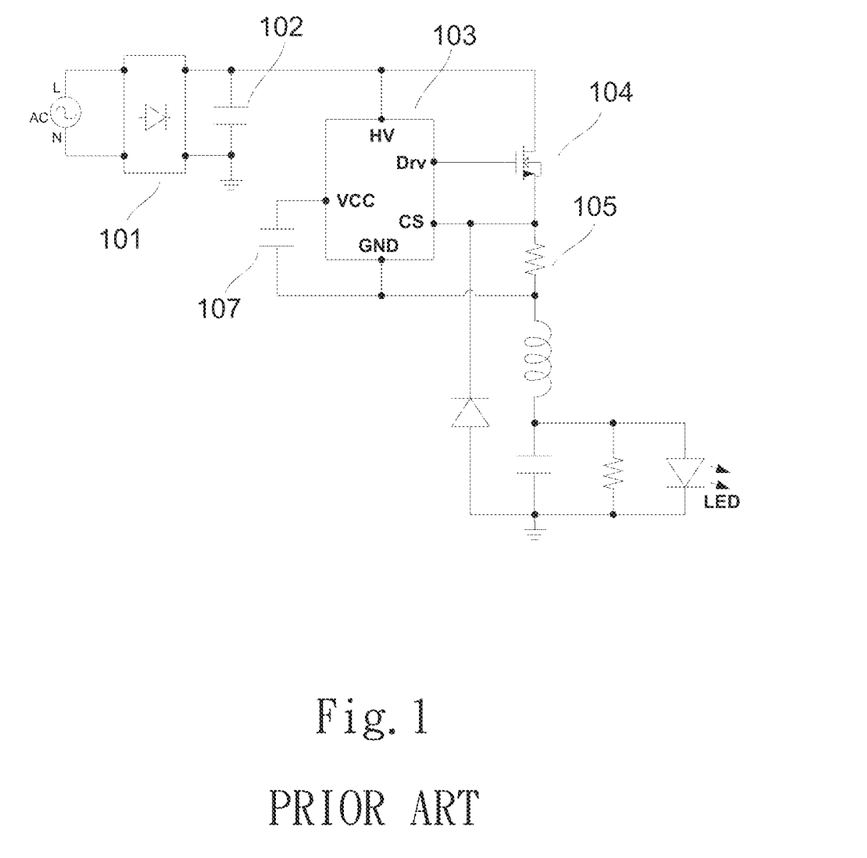
FIG. 1 is a circuit diagram of a conventional LED drive power supply.

However, for the step-down LED drive power supply which has the floating structure (i.e. the ground of the control chip and output ground of the power supply module have different potentials), a power supply capacitor is essential. For example, in an LED drive power supply shown in FIG. 1, a control chip 103 must require a power supply capacitor 107. The function of the power supply capacitor 107 is to supply power to the control chip 103 when a power switching transistor 104 is conducted. According to the principle of circuit, when the power switching transistor 104 is conducted, voltages ($V_{ds}$) at two ends of the power switching transistor 104 tend to be 0V. Besides, the voltages at the two ends of the power switching transistor 104 is almost equal to a voltage between a power supply terminal (HV) and a ground terminal (GND) of the control chip 103 since the power supply terminal (HV) of the control chip 103 is connected to a drain of the power switching transistor 104 and only a sampling resistor 105 is located between the ground terminal (GND) of the control chip 103 and a source of the power switching transistor 104. Accordingly, when the power switching transistor 104 is conducted, the voltages at the two ends of the power switching transistor 104 tend to be 0V, that is, the voltage between the power supply terminal (HV) and the ground terminal (GND) of the control chip 103 tends to 0V. As shown in a waveform 200 of FIG. 2, if the power supply capacitor 107 is not provided at this time, the control chip 103 will not be able to supply power and will not work normally. When the power switching transistor 104 is turned off, the voltages at two ends of the power switching transistor 104 are almost equal to a voltage of an input capacitor 102. At this time, the voltage between the power supply terminal (HV) and the ground terminal (GND) of the control chip 103 is also equal to the voltage of the input capacitor 102, so during a period in which the power switching transistor 104 is in off-state, the control chip 103 draws electric power from the input capacitor 102 through its power supply terminal (HV), part of the electric power is used for a working current of the control chip 103, and another part is stored in the power supply capacitor 107 in order to supply electric power to the control chip 103 during on-state of the power switching transistor 104. Therefore, for the step-down structured LED drive power supply, the power supply capacitor 107 is indispensable, but this inevitably leads to larger volume and high costs of the LED drive power supply.

SUMMARY OF THE INVENTION

The main purpose of the invention is to solve the drawbacks of large volume and high costs of the conventional LED drive power supply of the prior art.

In order to solve the above problem, the invention provides a light-emitting diode (LED) drive power supply and a controller thereof. The controller of an LED drive power supply is configured to control a power switching transistor, wherein a drain terminal of the power switching transistor is coupled to a positive output terminal of a DC power supply module. The controller comprises a power supply terminal, a ground terminal, and a driver. The power supply terminal is coupled to the positive output terminal of the DC power supply module to provide electric power for generating an internal supply voltage of the controller, and the ground terminal is coupled to a source terminal of the power switching transistor, and wherein the ground terminal and an output ground of the DC power supply module have different potentials. The driver is configured to control the power switching transistor operating in a saturation region when the power switching transistor is in on-state to maintain a voltage across the power supply terminal and the ground terminal higher than the internal supply voltage of the controller.

In one embodiment, the power switching transistor is coupled to a current detector configured to sense a current flowing through the power switching transistor.

In one embodiment, the current detector comprises a sampling resistor having a first terminal coupled to a sampling terminal of the controller and a second terminal coupled to the ground terminal.

In one embodiment, the controller comprises a logic control circuit received a sampling signal from a sample terminal to generate a first control signal to the driver, wherein the driver generates a first driving signal to control the power switching transistor according to the first control signal.

In one embodiment, the logic control circuit comprises a first comparator having a non-inverting input terminal coupled to the sampling terminal and an inverting input terminal received a reference voltage; a second comparator having an inverting input terminal coupled to the sampling terminal and a non-inverting input terminal received a reference voltage indicating a current flowing through the power switching transistor across zero; and an RS flip-flop having a reset terminal coupled to an output terminal of the first comparator and a set terminal coupled to an output terminal of the second comparator and an output terminal coupled to a control terminal of the driver.

In one embodiment, the controller comprises a bias circuit configured to receive a power supply voltage from the power supply terminal and generate a bias voltage to the driver.

In one embodiment, the internal supply voltage of the controller is different from the bias voltage.

In one embodiment, the bias circuit includes a resistor and a bias unit, wherein a first terminal of the resistor is coupled to the power supply terminal, wherein a second terminal of the resistor is coupled to an input terminal of the bias unit, and wherein an output terminal of the bias unit is coupled to a power supply terminal of the driver.

In one embodiment, the bias unit comprises one or a plurality of metal-oxide-semiconductor (MOS) transistors coupled in series.

In one embodiment, the bias unit comprises one or a plurality of diodes coupled in series.

In one embodiment, the bias unit comprises a voltage stabilizing diode.

In one embodiment, the bias circuit includes a resistor and a bias unit, wherein an input terminal of the bias unit is coupled to the power supply terminal, wherein an output terminal of the bias unit is coupled to a first terminal of the resistor, and wherein a second terminal of the resistor is coupled to a power supply terminal of the driver.

In one embodiment, the controller further includes a junction field-effect transistor (JFET) coupled between the power supply terminal of the controller and the bias circuit.

In one embodiment, the controller further includes an internal power supply unit coupled with the JFET to provide the internal supply voltage.

In one embodiment, the driver includes a first switching transistor, a second switching transistor, a third switching transistor and a fourth switching transistor, wherein the first and the second switching transistor comprise P-type switching transistors, and wherein the third and the fourth switching transistor comprise N-type switching transistors, and wherein a source of the first switching transistor and a source of the second switching transistor respectively receive a bias voltage, and wherein a drain of the first switching transistor is coupled to a drain of the third switching transistor, and wherein a drain of the second switching transistor is coupled to a drain of the fourth switching transistor, and wherein a source of the third switching transistor and a source of the fourth switching transistor are respectively coupled to the ground terminal, and wherein a gate of the first switching transistor and a gate of the third switching transistor respectively receive a first control signal, and wherein a gate of the second switching transistor and a gate of the fourth switching transistor respectively coupled to the drain of the first switching transistor.

The invention further provides an LED drive power supply disposed to drive an LED light source. The LED drive power supply comprises a power supply module, a power switching transistor, a sampling resistor, a controller as described above, a flyback diode and an energy storage inductor. A positive electrode of the flyback diode is coupled to a negative electrode of the LED light source, and a negative electrode of the LED light source is coupled to a sampling terminal of the controller. A first terminal of the energy storage inductor is coupled to a source terminal of the power switching transistor, and a second terminal of the energy storage inductor is coupled to a positive electrode of the LED light source.

In one embodiment, the LED drive power supply further comprises an input capacitor coupled between a positive output terminal and an output ground of the power supply module, and an output capacitor coupled with the LED light source in parallel.

In one embodiment, the power supply module includes a rectifier bridge.

According to the above features of the invention, when the controller outputs a high level to the power switching transistor, the power switching transistor is conducted. Since the power switching transistor works in the saturation region at this time, and a voltage difference between the power supply terminal and the ground terminal of the controller is sufficiently high, ensuring that the controller is capable of getting electric power from the power supply terminal thereof. Even if no power supply capacitor is provided, the controller can be operated normally. Therefore, volume and costs of the LED drive power supply can be reduced.

DETAILED DESCRIPTION OF THE PREFERRED EMBODIMENTS

The technical solutions in the embodiments of the invention will be described clearly and completely in conjunction with the figures in the embodiments of the invention. Obviously, the described embodiments are merely a part of the embodiments of the invention, but not all the embodiments. Based on the embodiments of the invention, all other embodiments obtained by a person having ordinary skill in the art without making inventive effort still fall within the scope protected by the invention.

Figure 3:
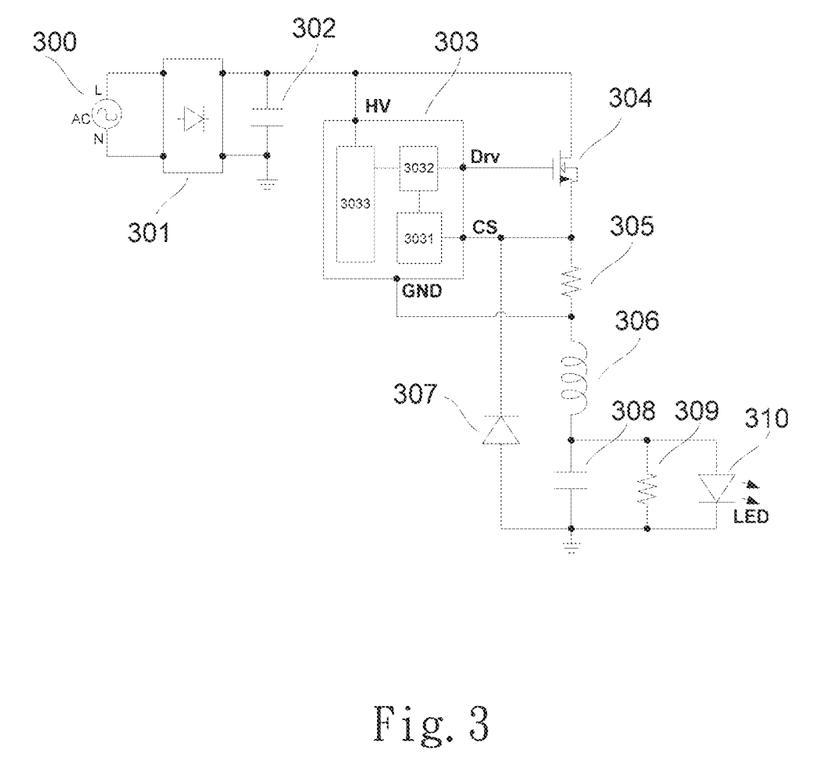
FIG. 3 is a circuit diagram of a first embodiment of an LED drive power supply of the invention.

FIG. 3 is a circuit diagram of a first embodiment of a light-emitting diode (LED) drive power supply of the invention. The LED drive power supply of this embodiment is a step-down LED drive power supply with floating structure. The LED drive power supply is used to drive an LED light source 310, and the LED drive power supply includes a power supply module 301, a controller 303, a power switching transistor 304, a sampling resistor 305, an energy storage inductor 306, and a flyback diode 307. An external port of the controller 303 includes a power supply terminal (HV), a ground terminal (GND), a drive terminal (Drv), and a sampling terminal (CS).

In this embodiment, the power supply terminal (HV) of the controller 303 is coupled to a positive output terminal of the DC (direct current) power supply module 301 to provide electric power for generating an internal supply voltage of the controller 303. The drive terminal (Drv) of the controller 303 is coupled to a gate of the power switching transistor 304. The ground terminal (GND) of the controller 303 is coupled to a source terminal of the power switching transistor 304, wherein the ground terminal (GND) and an output ground of the DC power supply module 301 have different potentials. In one embodiment, the power switching transistor is coupled to a current detector configured to sense a current flowing through the power switching transistor 304. The current detector comprises the sampling resistor 305 having a first terminal coupled to a sampling terminal (CS) of the controller 303 and a second terminal coupled to the ground terminal (GND). A drain terminal of the power switching transistor 304 is coupled to the positive output terminal of the DC power supply module 301, and the source terminal of the power switching transistor 304 coupled to the first terminal of the sampling resistor 305, A first terminal of the energy storage inductor 306 is coupled to the source terminal of the power switching transistor 304, a second terminal of the energy storage inductor 306 is coupled to a positive electrode of the LED light source 310, a negative electrode of the LED light source 310 is coupled to the output ground of the DC power supply module 301 and a positive electrode of the flyback diode 307, and a negative electrode of the flyback diode 307 is coupled to the sampling terminal (CS).

Moreover, the controller 303 includes a logic control circuit 3031, a driver 3032, and a bias circuit 3033. The logic control circuit 3031 generates a control signal according to a sampling voltage input from the sampling terminal (CS). Specifically, when the power switching transistor 304 is turned off, the logic control circuit 3031 determines whether the sampling voltage is zero; if so, a first control signal is generated. When the power switching transistor 304 is conducted, the logic control circuit 3031 determines whether the sampling voltage is greater than a reference voltage; if so, a second control signal is generated. The driver 3032 is configured to control the power switch transistor 304 operating in a saturation region when the power switching transistor 304 is in on-state to maintain a voltage across the power supply terminal (HV) and the ground terminal (GND) higher than the internal supply voltage of the controller 303. More specifically, the driver 3032 generates a first driving signal to control the power switching transistor 304 according to the first control signal, and generates a second driving signal to the power switching transistor 304 according to the second control signal. The bias circuit 3033 is configured to receive a power supply voltage from the power supply terminal (HV), and generate a bias voltage stepped down by the power supply voltage to the driver 3032 to control the power switching transistor 304 operating in a saturation region according to the first driving signal and the second driving signal. The internal supply voltage of the controller 303 is different from the bias voltage.

In addition, in this embodiment, the DC power supply module 301 is a rectifier bridge, and two input terminals of the DC power supply module 301 are coupled to an alternating current (AC) supply mains 300. The LED drive power supply further includes an input capacitor 302, an output capacitor 308, and a resistor 309. The input capacitor 302 is coupled between the positive output terminal and the output ground of the DC power supply module 301. The output capacitor 308 and the resistor 309 are respectively coupled with the LED light source 310 in parallel.

Figure 2:
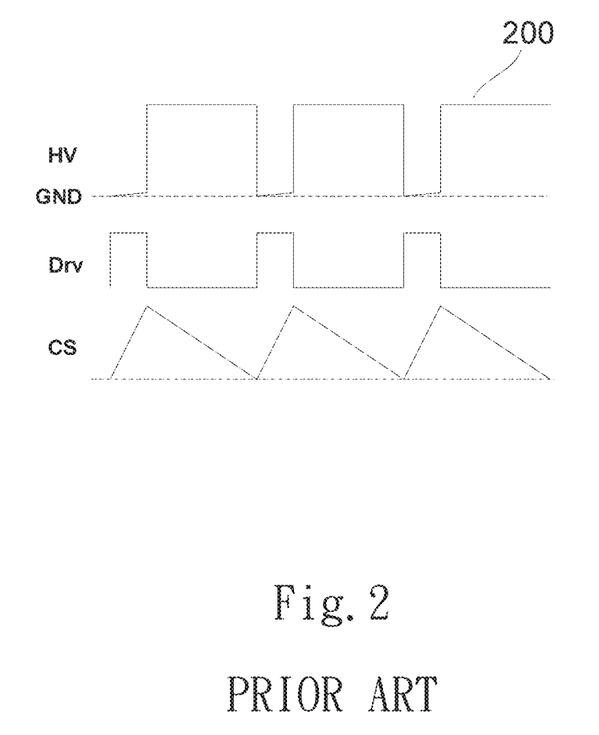
FIG. 2 is an operating waveform diagram of the LED drive power supply of FIG. 1.
Figure 4:
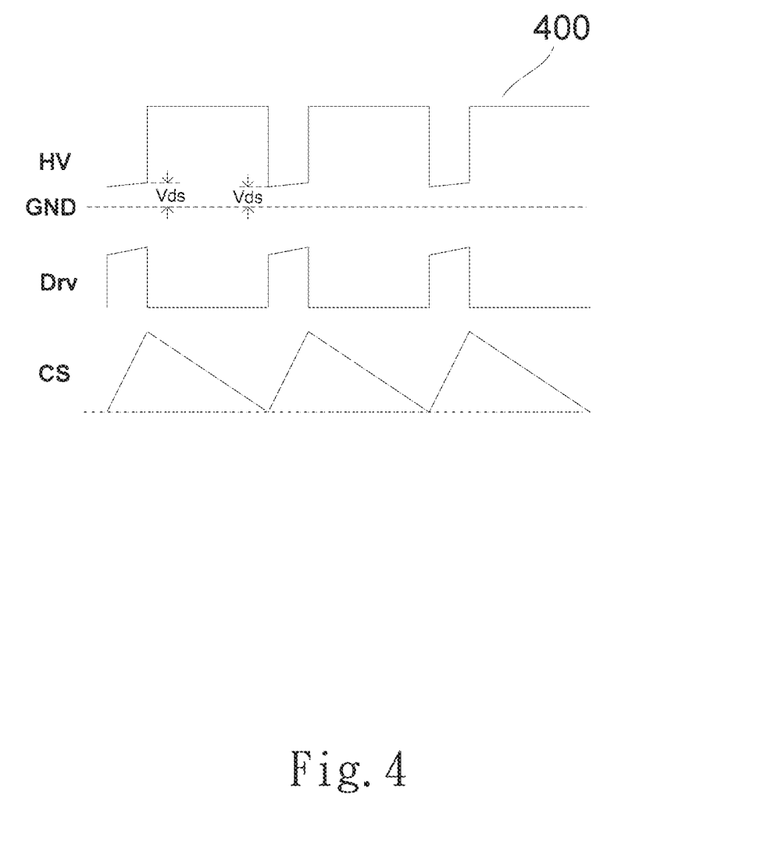
FIG. 4 is an operating waveform diagram of the LED drive power supply of FIG. 3.

Please refer to FIG. 3 and FIG. 4, when the sampling voltage input from the sampling terminal (CS) of the controller 303 is zero, and when the drive terminal (Drv) generates the first driving signal which is high level, the power switching transistor 304 is conducted. In the case of neglecting a voltage of the sampling resistor 305, a voltage across the power supply terminal (HV) and the ground terminal (GND) of the controller 303 is about a voltage ($V_{ds}$) at two ends of the power switching transistor 304. At this time, the voltage ($V_{ds}$) is high enough since the power switching transistor 304 operates in the saturation region, so it can be ensured that the controller 303 is capable of getting electric power from the power supply terminal (HV). Comparing FIG. 2 and FIG. 4, the voltage differences between the power supply terminal (HV) of the controller 303 (103) and the ground terminal (GND) are different during the on-state of the power switching transistor 304 (104). More specifically, the voltage difference in FIG. 2 is almost zero, while the voltage difference in FIG. 4 is about the voltage ($V_{ds}$). Since the voltage ($V_{ds}$) of the power switching transistor 304 operating in the saturation region is sufficiently high, it can be ensured that the controller 303 is capable of operating normally, and there is no need to provide a power supply capacitor. Therefore, the volume and costs of the LED drive power supply of this embodiment can be reduced.

Figure 5:
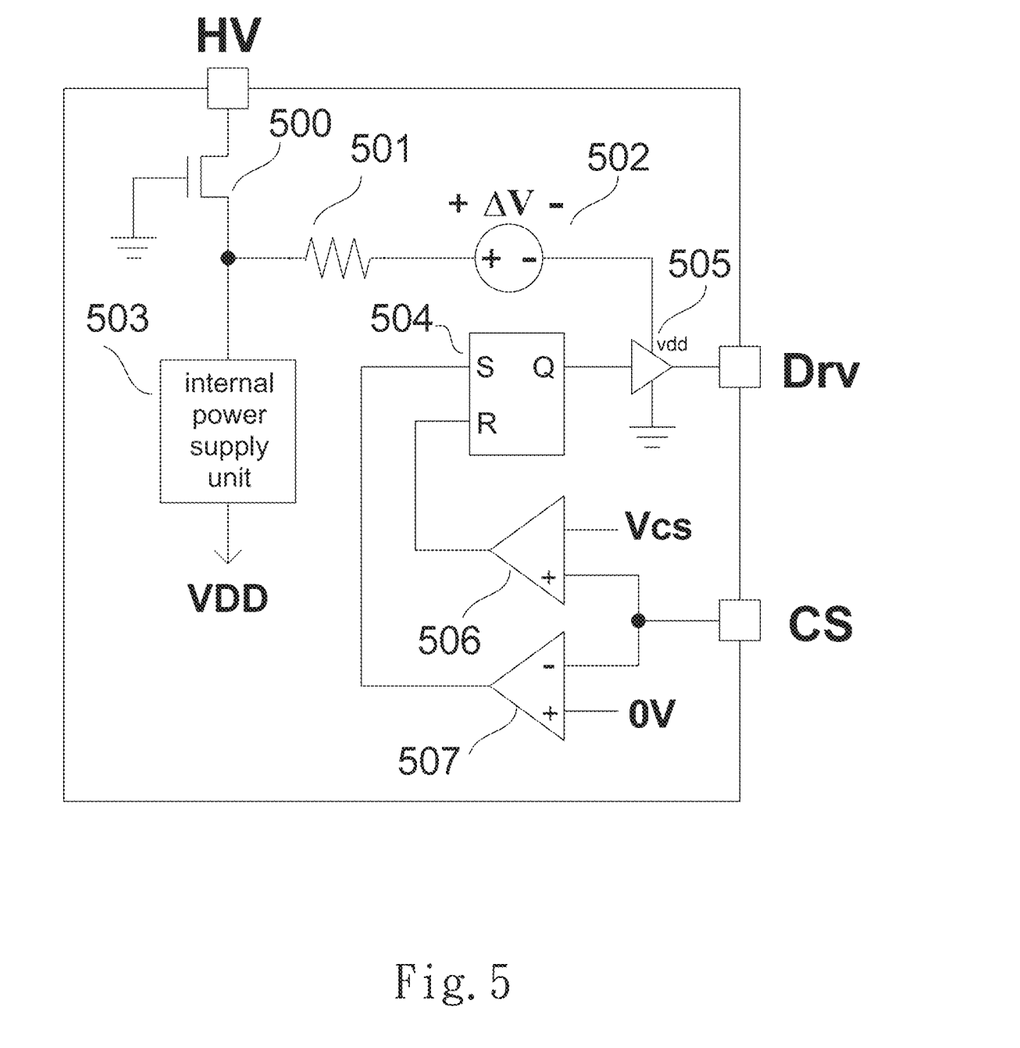
FIG. 5 is a circuit diagram of a first embodiment of a controller of the LED drive power supply of the invention.

FIG. 5 is a circuit diagram of a first embodiment of the controller of the LED drive power supply of the invention. The controller of this embodiment includes a junction field-effect transistor (JFET) 500, an internal power supply unit 503, a logic control circuit, a driver 505, and a bias circuit. The JFET 500 is a high-voltage resistant JFET, wherein a first terminal of the JFET 500 is coupled to the power supply terminal (HV) of the controller, and a second terminal of the JFET 500 is coupled to the bias circuit and the internal power supply unit 503, wherein the internal power supply unit provides the internal supply voltage. The main function of the JFET 500 is to isolate high voltage, that is, the JFET 500 converts the high voltage into a voltage that the internal circuits can withstand.

In this embodiment, the logic control circuit receives a sampling signal from a sample terminal to generate the first control signal to the driver, wherein the driver generates the first driving signal to control the power switching transistor 304 according to the first control signal. The logic control circuit includes a first comparator 506, a second comparator 507, and an RS flip-flop 504. A non-inverting input terminal of the first comparator 506 and an inverting input terminal of the second comparator 507 are respectively coupled to the sampling terminal (CS). An inverting input terminal of the first comparator 506 is received a reference voltage ($V_{cs}$), and a non-inverting input terminal of the second comparator 507 is received a reference voltage indicating a current flowing through the power switching transistor 304 across zero (0V). An output terminal of the first comparator 506 is coupled to a reset terminal (R) of the RS flip-flop 504, an output terminal of the second comparator 507 is coupled to a set terminal (S) of the RS flip-flop 504, and an output terminal (Q) of the RS flip-flop 504 is coupled to a control terminal of the driver 505.

In this embodiment, the bias circuit includes a resistor 501 and a bias unit 502. A first terminal of the resistor 501 is coupled to a second terminal of the JFET 500, a second terminal of the resistor 501 is coupled to an input terminal of the bias unit 502, and an output terminal of the bias unit 502 is coupled to a power supply terminal of the driver 505. In other embodiments, positions of the resistor 501 and the bias unit 502 can be interchanged, that is, the input terminal of the bias unit 502 is coupled to the power supply terminal (HV), and the output terminal of the bias unit 502 is coupled to the first terminal of the resistor 501, and the second terminal of the resistor 501 is coupled to the power supply terminal of the driver 505.

Figure 6A:
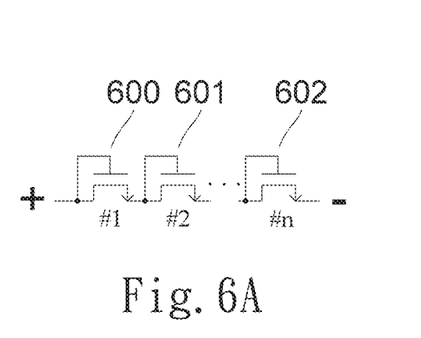
FIG. 6A is a circuit diagram of a first embodiment of a bias unit of the controller of the invention.
Figure 6B:
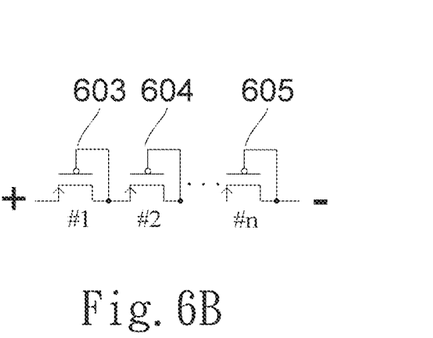
FIG. 6B is a circuit diagram of a second embodiment of the bias unit of the controller of the invention.
Figure 6C:
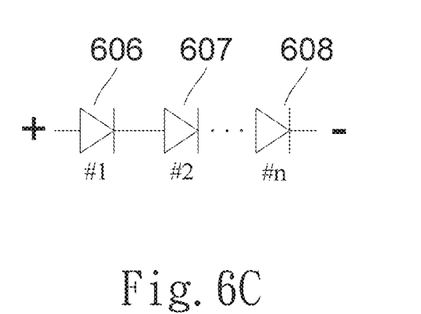
FIG. 6C is a circuit diagram of a third embodiment of the bias unit of the controller of the invention.
Figure 6D:
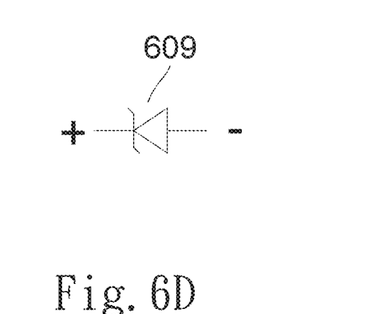
FIG. 6D is a circuit diagram of a fourth embodiment of the bias unit of the controller of the invention.

Regarding the bias unit 502, as long as a circuit with a voltage difference between "+" and "−" is fixed at ΔV, such type of circuit is within the scope of the invention. Therefore, the bias unit 502 includes but not limited to the following implementation that one or a plurality of metal-oxide-silicon (MOS) transistors coupled in series; one or a plurality of diodes coupled in series; and a voltage stabilizing diode. In one embodiment, as shown in FIG. 6A, the bias unit is composed of n-type metal-oxide-silicon (NMOS) transistors 600, 601, . . . , 602 coupled in series, wherein the amount of the NMOS transistors is "n". A drain of the first NMOS transistor 600 is an input terminal, and a source of the last NMOS transistor 602 is an output terminal. At this time, $\Delta V = n \ast V_{gs(n)}$, wherein $V_{gs(n)}$ is a gate-source voltage of the NMOS transistor. In one embodiment, as shown in FIG. 6B, the bias unit is composed of p-type metal-oxide-silicon (PMOS) transistors 603, 604, . . . , 605 coupled in series, wherein the amount of the PMOS transistors is "n". A drain of the first PMOS transistor 603 is an input terminal, and a source of the last PMOS transistor 605 is an output terminal. At this time, $\Delta V = n*V_{gs(p)}$, wherein $V_{gs(p)}$ is a gate-source voltage of the PMOS transistor. In one embodiment, as shown in FIG. 6C, the bias unit is composed of diodes 606, 607, . . . , 608 coupled in series, wherein the amount of the diodes is "n". A positive electrode of the first diode 606 is an input terminal, and a negative electrode of the last diode 608 is an output terminal. At this time, $\Delta V = n*V_F$, wherein $V_F$ is a forward on-state voltage of the diode. In one embodiment, as shown in FIG. 6D, the bias unit is a voltage stabilizing diode 609. A negative electrode of the voltage stabilizing diode 609 is an input terminal, and a positive electrode of the voltage stabilizing diode 609 is an output terminal. At this time, $\Delta V = V_{zd}$, wherein $V_{zd}$ is a stable voltage of the voltage stabilizing diode 609.

Figure 7:
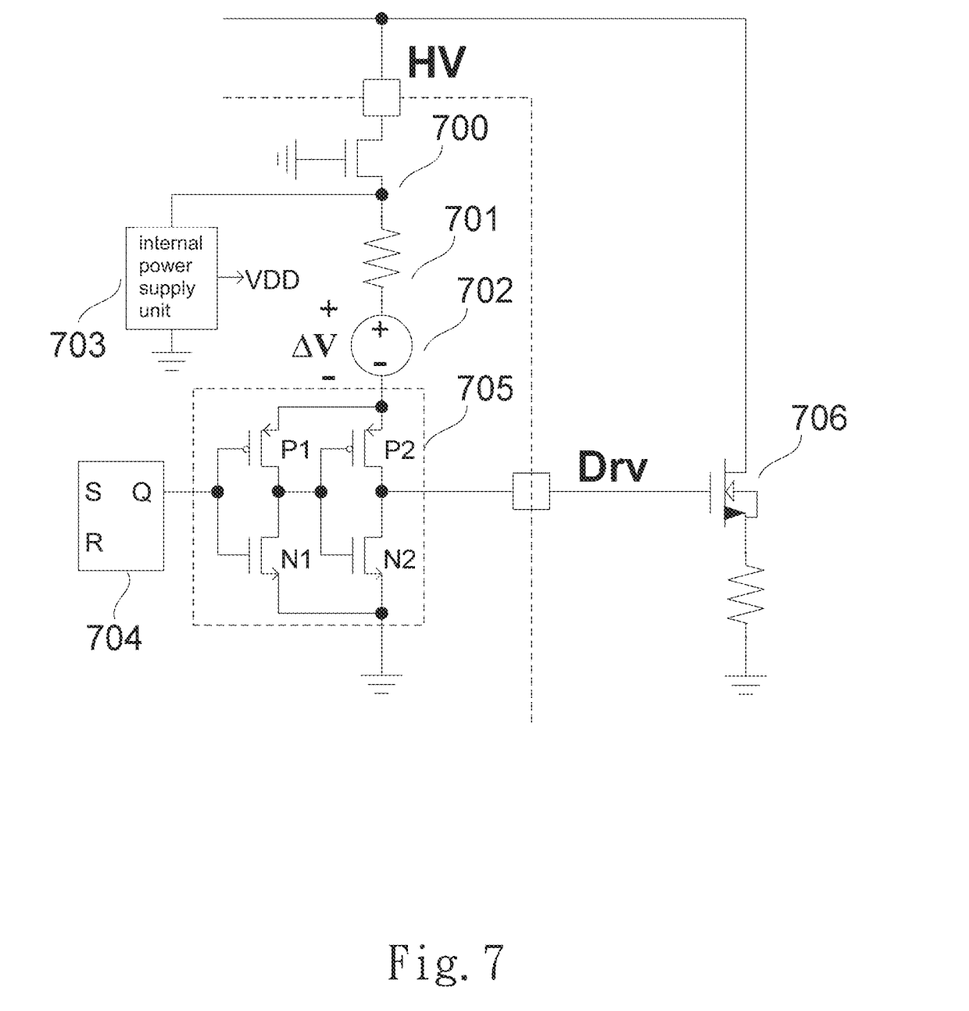
FIG. 7 is a circuit diagram of a second embodiment of the controller of the LED drive power supply of the invention.

FIG. 7 is a circuit diagram of a second embodiment of the controller of the LED drive power supply of the invention. The controller of this embodiment includes a JFET 700, an internal power supply unit 703, a logic control circuit, a driver 705, and a bias circuit. The JFET 700 is a high-voltage resistant JFET, wherein a first terminal of the JFET 700 is coupled to the power supply terminal (HV), and a second terminal of the JFET 700 is coupled to the bias circuit and the internal power supply unit 703. The main function of the JFET 700 is to isolate high voltage, that is, the JFET 700 converts the high voltage into a voltage that the internal circuits can withstand.

In this embodiment, the logic control circuit includes a first comparator (not shown), a second comparator (not shown) and an RS flip-flop 704. The connection relationship between the first comparator, the second comparator and the RS flip-flop 704 is similar to the logic control circuit shown in FIG. 5, and thus will not be mentioned hereinafter.

In this embodiment, the bias circuit includes a resistor 701 and a bias unit 702. A first terminal of the resistor 701 is coupled to a second terminal of the JFET 700, a second terminal of the resistor 701 is coupled to an input terminal of the bias unit 702, and an output terminal of the bias unit 702 is coupled to a power supply terminal of the driver 705. In other embodiments, positions of the resistor 701 and the bias unit 702 can be interchanged.

In this embodiment, the driver 705 includes a first switching transistor P1, a second switching transistor P2, a third switching transistor N1, and a fourth switching transistor N2, wherein the first switching transistor P1 and the second switching transistor P2 comprise P-type switching transistors, and the third switching transistor N1 and the fourth switching transistor N2 comprise N-type switching transistors. A source of the first switching transistor P1 and a source of the second switching transistor P2 are respectively connected to an output terminal of the bias circuit. A drain of the first switching transistor P1 is coupled to a drain of the third switching transistor N1, and a drain of the second switching transistor P2 is coupled to a drain of the fourth switching transistor N2. A source of the third switching transistor N1 and a source of the fourth switching transistor N2 are respectively connected to the ground terminal (GND). A gate of the first switching transistor P1 and a gate of the third switching transistor N1 are respectively coupled to an output terminal (Q) of the RS flip-flop 704, and a gate of the second switching transistor P2 and a gate of the fourth switching transistor N2 are respectively coupled to the drain of the first switching transistor P1.

This embodiment is capable of ensuring that the voltage difference between the power supply terminal (HV) and the ground terminal (GND) of the controller is greater than a minimum operating voltage at any time. According to the operating principle, a minimum voltage difference between the power supply terminal (HV) and the ground terminal (GND) of the controller occurs during the period that the power switching transistor 706 is in on-state, especially at a moment when the power switching transistor 706 is conducted instantly.

Figure 8:
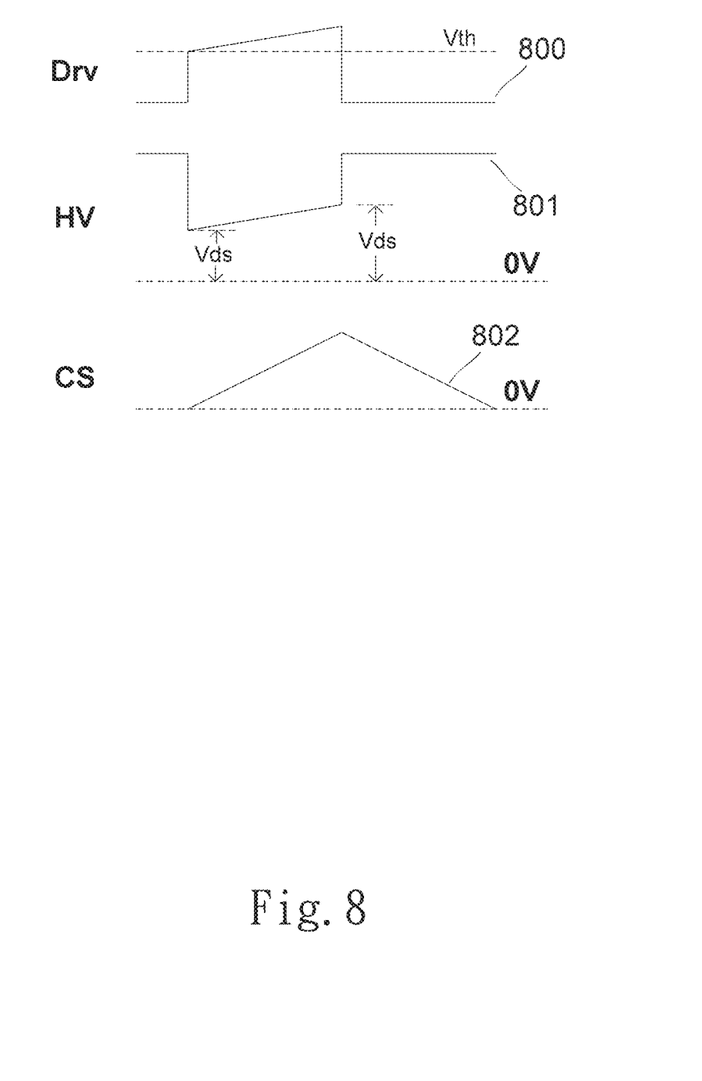
FIG. 8 is an operating waveform diagram of the LED drive power supply of FIG. 7.

Please refer to FIG. 7 and FIG. 8. A voltage between the drive terminal (Drv) and the power supply terminal (HV) of the controller differs by $\Delta V$. When the RS flip-flop 704 generates a high level signal, the high level signal is output to a gate of the power switching transistor 706 through the driver 705, and the power switching transistor 706 starts to conduct, thereby the voltages (i.e. the drain-source voltage ($V_{ds}$) of the metal-oxide-semiconductor field-effect transistor (MOSFET)) at two ends of the power switching transistor 706 begin to drop. When the voltage between the two ends of the power switching transistor 706 drops too low, a voltage of the drive terminal (Drv) cannot keep the power switching transistor 706 fully conducted, thereby the power switching transistor 706 enters the saturation region, causing the voltage ($V_{ds}$) between the two ends of the power switching transistor 706 to start to rise. The rise of the $V_{ds}$ causes a driving voltage of the gate of the power switching transistor 706 to rise, and finally the voltage ($V_{ds}$) between the two ends of the power switching transistor 706 stabilize around a specific voltage value.

According to the characteristics of the MOS transistor, a voltage ($V_{Drv}$) of the drive terminal (Drv) of the controller must be greater than a threshold value ($V_{th}$) in order to conduct the power switching transistor 706. Besides, the voltage ($V_{Drv}$) is equal to a voltage ($V_{HV}$) of the power supply terminal (HV) minus $\Delta V$. Accordingly, in order to ensure that the power switching transistor 706 is conducted, the voltage ($V_{Drv}$) must be greater than the threshold value ($V_{th}$), that is, $V_{Drv} = V_{HV} - \Delta V > V_{th}$, and the following equation could be obtained: $V_{HV} > \Delta V + V_{th}$. For example, a gate-source voltage ($V_{gs}$) is required to maintain a current (Id) flowing through the power switching transistor 706. During the conducted period of the power switching transistor 706, the voltage ($V_{HV}$) of the power supply terminal (HV) is $V_{HV} = V_{ds} = V_{gs} + \Delta V$. If the bias unit is shown as FIG. 6A and n=3, then $\Delta V = 3*0.7V = 2.1V$, wherein 0.7V is the threshold value OW of the NMOS transistor. Besides, the gate-source voltage ($V_{gs}$) is $V_{gs} \approx 2.5V$ since the power switching transistor 706 is a high-voltage power switch which has a threshold voltage 2.5V while operating in the saturation region. Accordingly, the voltage of the power supply terminal (HV) is $V_{HV} = V_{gs} + \Delta V \approx 2.5V + 2.1 = 4.6V$, which is enough to ensure the internal power supply of the controller. Based on the above analysis, the voltage of the power supply terminal (HV) of the controller can be adjusted by changing the voltage difference $\Delta V$ of the bias unit 702.

In addition, a resistor coupled in series with the bias unit 702 is used to slow down a rising slope of the driving voltage of the power switching transistor 706. Please refer to FIG. 7, the voltages ($V_{ds}$) at the two ends of the power switching transistor 706 are fed back to the driving signal of the power switching transistor 706 via the power supply terminal (HV) through the resistor 701 and the bias unit 702. Since parasitic capacitance exists in each circuit node, a response speed of the loop is inevitably not too fast, which can avoid the following situation: if the driving voltage of the power switching transistor 706 rises too fast, causing the voltages ($V_{ds}$) at the two ends of the power switching transistor 706 to decrease, but a response speed from the power supply terminal (HV) to the drive terminal (Drv) is very slow, which will inevitably cause the voltages ($V_{ds}$) at the two ends of the power switching transistor 706 to drop too low, that is, the voltage of the power supply terminal (HV) is too low, and the controller is incapable of supplying power.

Finally, it should be explained that each waveform in the sequential diagrams shown in FIG. 2, FIG. 4, and FIG. 8 uses the ground terminal (GND) of the controller as a reference ground.

What is claimed is:

1. A controller of an LED drive power supply, configured to control a power switching transistor, wherein a drain terminal of the power switching transistor is coupled to a positive output terminal of a DC power supply module, and the controller comprising:
   a power supply terminal and a ground terminal, wherein the power supply terminal is coupled to the positive output terminal of the DC power supply module to provide electric power for generating an internal supply voltage of the controller, wherein the ground terminal is coupled to a source terminal of the power switching transistor, and wherein the ground terminal and an output ground of the DC power supply module have different potentials; and
   a driver, configured to control the power switching transistor operating in a saturation region when the power switching transistor is in on-state to maintain a voltage across the power supply terminal and the ground terminal higher than the internal supply voltage of the controller.

2. The controller of the LED drive power supply as claimed in claim 1, wherein the power switching transistor is coupled to a current detector configured to sense a current flowing through the power switching transistor.

3. The controller of the LED drive power supply as claimed in claim 2, wherein the current detector comprises a sampling resistor having a first terminal coupled to a sampling terminal of the controller and a second terminal coupled to the ground terminal.

4. The controller of the LED drive power supply as claimed in claim 1, wherein the controller comprises a logic control circuit received a sampling signal from a sample terminal to generate a first control signal to the driver, wherein the driver generates a first driving signal to control the power switching transistor according to the first control signal.

5. The controller of the LED drive power supply as claimed in claim 4, wherein the logic control circuit comprises a first comparator having a non-inverting input terminal coupled to the sampling terminal and an inverting input terminal received a reference voltage; a second comparator having an inverting input terminal coupled to the sampling terminal and a non-inverting input terminal received a reference voltage indicating a current flowing through the power switching transistor across zero; and an RS flip-flop having a reset terminal coupled to an output terminal of the first comparator and a set terminal coupled to an output terminal of the second comparator and an output terminal coupled to a control terminal of the driver.

6. The controller of the LED drive power supply as claimed in claim 1, wherein the controller comprises a bias circuit configured to receive a power supply voltage from the power supply terminal and generate a bias voltage to the driver.

7. The controller of the LED drive power supply as claimed in claim 6, wherein the internal supply voltage of the controller is different from the bias voltage.

8. The controller of the LED drive power supply as claimed in claim 6, wherein the bias circuit includes a resistor and a bias unit, wherein a first terminal of the resistor is coupled to the power supply terminal, wherein a second terminal of the resistor is coupled to an input terminal of the bias unit, and wherein an output terminal of the bias unit is coupled to a power supply terminal of the driver.

9. The controller of the LED drive power supply as claimed in claim 8, wherein the bias unit comprises one or a plurality of metal-oxide-semiconductor (MOS) transistors coupled in series.

10. The controller of the LED drive power supply as claimed in claim 8, wherein the bias unit comprises one or a plurality of diodes coupled in series.

11. The controller of the LED drive power supply as claimed in claim 8, wherein the bias unit comprises a voltage stabilizing diode.

12. The controller of the LED drive power supply as claimed in claim 6, wherein the bias circuit includes a resistor and a bias unit, wherein an input terminal of the bias unit is coupled to the power supply terminal, wherein an output terminal of the bias unit is coupled to a first terminal of the resistor, and wherein a second terminal of the resistor is coupled to a power supply terminal of the driver.

13. The controller of the LED drive power supply as claimed in claim 12, wherein the bias unit comprises one or a plurality of MOS transistors coupled in series.

14. The controller of the LED drive power supply as claimed in claim 12, wherein the bias unit comprises one or a plurality of diodes coupled in series.

15. The controller of the LED drive power supply as claimed in claim 12, wherein the bias unit comprises a voltage stabilizing diode.

16. The controller of the LED drive power supply as claimed in claim 6, wherein the controller further includes a junction field-effect transistor (JFET) coupled between the power supply terminal of the controller and the bias circuit.

17. The controller of the LED drive power supply as claimed in claim 16, wherein the controller further includes an internal power supply unit coupled with the JFET to provide the internal supply voltage.

18. The controller of the LED drive power supply as claimed in claim 1, wherein the driver includes a first switching transistor, a second switching transistor, a third switching transistor and a fourth switching transistor, wherein the first and the second switching transistor comprise P-type switching transistors, and wherein the third and the fourth switching transistor comprise N-type switching transistors, and wherein a source of the first switching transistor and a source of the second switching transistor respectively receive a bias voltage, and wherein a drain of the first switching transistor is coupled to a drain of the third switching transistor, and wherein a drain of the second switching transistor is coupled to a drain of the fourth switching transistor, and wherein a source of the third switching transistor and a source of the fourth switching transistor are respectively coupled to the ground terminal, and wherein a gate of the first switching transistor and a gate of the third switching transistor respectively receive a first control signal, and wherein a gate of the second switching transistor and a gate of the fourth switching transistor respectively coupled to the drain of the first switching transistor.

19. An LED drive power supply, disposed to drive an LED light source, and the LED drive power supply comprising:
   a power supply module;
   a power switching transistor;
   a sampling resistor;
   a controller as claimed in claim 1;
   a flyback diode, wherein a positive electrode of the flyback diode is coupled to a negative electrode of the LED light source, and wherein a negative electrode of the flyback diode is coupled to a sampling terminal of the controller; and
   an energy storage inductor, wherein a first terminal of the energy storage inductor is coupled to a source terminal of the power switching transistor, and wherein a second terminal of the energy storage inductor is coupled to a positive electrode of the LED light source.

20. The LED drive power supply as claimed in claim 19, wherein the LED drive power supply further comprises an input capacitor coupled between a positive output terminal and an output ground of the power supply module, and an output capacitor coupled with the LED light source in parallel.

21. The LED drive power supply as claimed in claim 19, wherein the power supply module includes a rectifier bridge.

\* \* \* \* \*